UNITED STATES PATENT OFFICE.

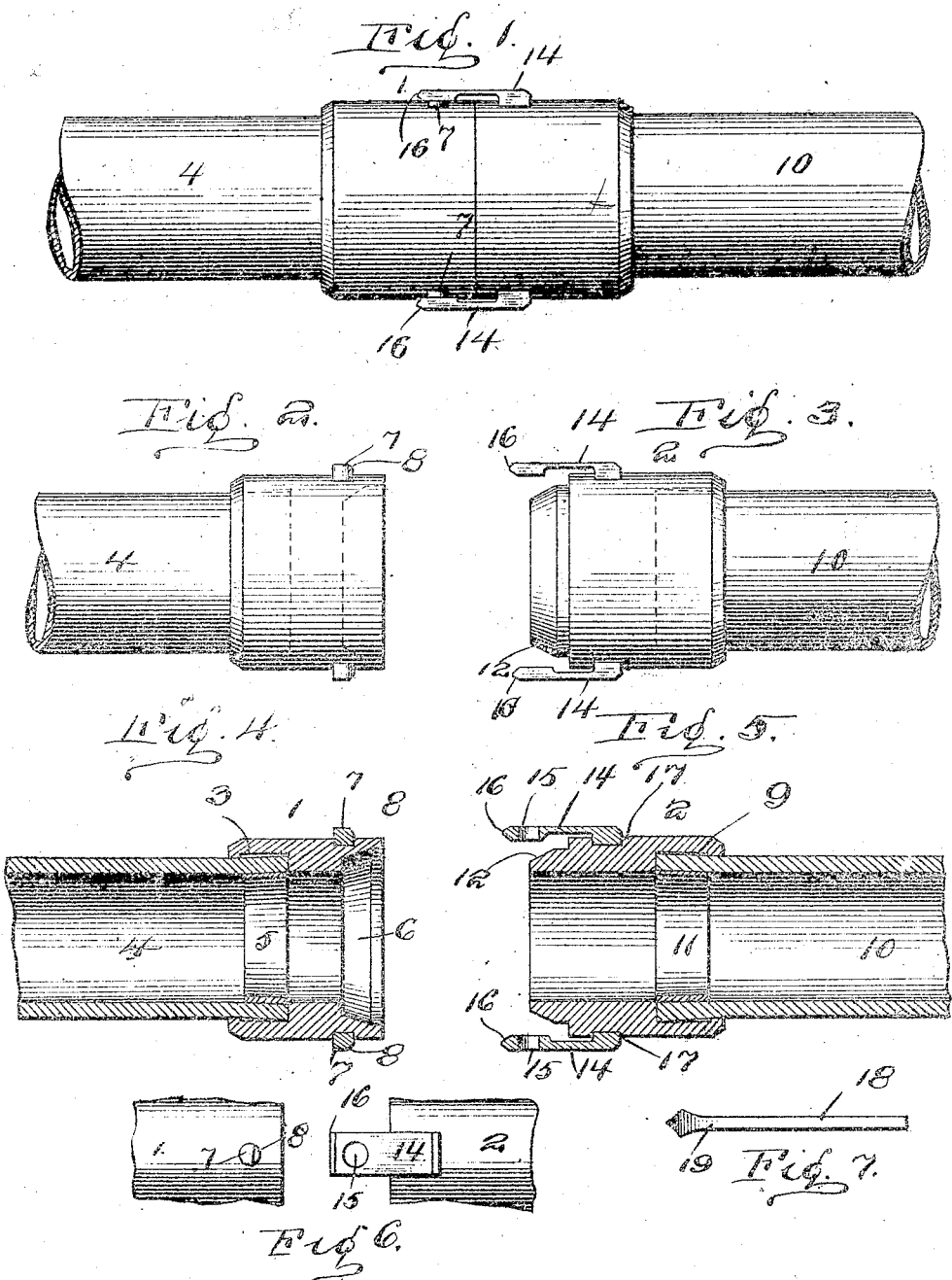

JOHN J. ANTZ, OF ALLEGHENY, PENNSYLVANIA.

HOSE-COUPLING.

No. 669,181.     Specification of Letters Patent.     Patented Jan. 14, 1902.

Application filed March 22, 1901. Serial No. 825,423.

*To all whom it may concern:*

Be it known that I, JOHN J. ANTZ, citizen of the United States of America, residing at Allegheny, in the county of Allegheny and State of Pennsylvania, have invented certain new and useful improvements in Hose-Couplings, of which the following is a specification, reference being had therein to the accompanying drawing.

This invention relates to certain new and useful improvements in hose couplings, and the invention has for its primary object the provision of novel means for rapidly and firmly securing the confronting ends of two sections of hose together.

To this end, I have devised a simple and inexpensive hose coupling particularly adapted for use upon fire hose, where it is necessary that the confronting ends of two sections of hose be expeditiously connected together. My improved coupling is so constructed that all danger of the same being disjoined when a hose is being dragged along a street is dispensed with, and positive and reliable means employed for firmly holding the confronting ends of two sections of hose together.

In constructing the coupling, I have aimed to use as simple devices as possible, thus permitting of the coupling being manufactured at a comparatively small cost, and readily adapted for connection with the present type of hose used by fire departments.

With the above and other objects in view, which will more readily appear as the nature of the invention is better understood, the same consists in the novel construction, combination and arrangement of parts to be hereinafter more fully described and claimed, and referring to the drawing accompanying this application, like numerals of reference designate corresponding parts throughout the several views, in which:—

Figure 1 is a side elevation of the confronting ends of two sections of hose secured together by my improved coupling, Fig. 2 is a side elevation of the female member of my improved coupling, Fig. 3 is a similar view of the male member, Fig. 4 is a longitudinal sectional view of the female member, Fig. 5 is a similar view of the male member, Fig. 6 is a fragmentary plan of a portion of the coupling illustrating the lock thereof, Fig. 7 is a plan of a lever or key used in connection with the coupling.

To put my invention into practice, I construct my improved coupling of two members 1 and 2, said members being constructed of brass, bronze or a similar durable metal. The one end of the member 1 is provided with an annular recess 3 to permit of a section of hose 4 being secured therein by a metallic band 5. The opposite end of the member 1 is provided with a tapering annular recess 6, while the periphery of the member is provided with two diametrically opposed lugs or pins 7, 7 having beveled faces 8, 8.

The one end of the member 2 is recessed, as at 9 similar to the member 1, to receive the end of a section of hose 10 which is fastened in said recess by a band or ring 11. In this connection, I do not care to confine myself to the manner in which the sections of hose 4 and 10 are secured in the members of my improved coupling. The opposite end of the member 2 is tapered, as at 12, corresponding to the taper of the annular recess 6 of the member 1, whereby the end of the member 2 will fit within the recess 6 of the member 1. At the inner end of the taper portion 6 of the member 1 a square lateral shoulder is formed, while the inner taper portion of the member 1 is formed parallel with the outer surface or in a longitudinal plane with the member 1. At the inner end of the taper portion 12 of the member 2 the outer surface is parallel with the longitudinal plane of the member 2 for a distance and with a square shoulder at the inner end of this parallel portion. The flat terminal of the member 2 thus bears against the internal shoulder of the member 1, and the flat terminal of the member 1 bears against the external shoulder of the member 2 when the members are united, while the opposing inclined surfaces 6 and 12 bear against each other. By this means a very rigid coupling is produced with an extended bearing surface. The arms 14, 14, are formed with relatively large intermediate recesses in their inner faces which provide corresponding spaces between the members 1 and 2 and the arms, to enable the releasing implement to be readily applied as hereafter described. The member 2 is provided with two diametrically opposed resilient arms 14, 14, said arms being provided with apertures 15, 15. The outer ends of the arms are tapered, as at 16, 16, and said arms may be made of resilient steel or a similar material. The same are posierably brazed in recesses 17, 17 formed in the member 2, but they may be otherwise fastened to said member.

The arms 14 are formed of suitable material and each is provided with an undercut portion 14ª formed intermediate its ends, thereby providing an arm having its ends of a thickness relatively enlarged with respect to the connecting portion. This construction provides for the resiliency of the arms, and prevents the placing of an excessive strain on the point of connection of the arm and the coupling member on which it is carried, in addition to which the space formed in undercutting, being located within the plane of the arm, provides for the insertion of an uncoupling tool hereinafter described, without affecting the plane of the outer surface of the arm in any respect. While the outer end of each arm is beveled, the fact that the end of the arm is relatively enlarged, being of a thickness substantially equal in thickness to the length of the pins 7, together with the opposing beveling of the pins, provides a structure which, when the members are coupled is substantially free from accidental disengagement by a longitudinal movement of the coupled hose in either direction.

When the members 1 and 2 carried by the sections of hose 4 and 10 respectively are to be secured together, the tapering end 12 of the member 2 is inserted into the recess 6 of the member 1, the tapering ends 16, 16 of the arms 14, 14 causing said arms to ride upwardly over the pins or lugs 7, 7 of the member 1. The arms 14, 14 then recede causing the pins or lugs 7, 7 to enter the apertures or openings 15, 15 of the arms 14, 14 thus firmly locking the member 2 in engagement with the member 1.

When it is desired to separate the two members, I preferably use a lever or key 18 having a curved headed end 19. The curved end of the lever or key is inserted between one of the arms 14 and the periphery of the member 2, said key or lever then being raised to elevate one of the arms 14 to permit of the two members being easily and quickly separated. The lever or key 18 is simply employed to provide sufficient leverage in elevating one end of a resilient arm 14.

I do not care to confine myself to the number of resilient arms 14, 14 or pins 7 employed in retaining one member in engagement with another, my whole invention residing in the novel construction of said arms together with the recess 6 and the tapering end 12 of said members.

Such changes as are permissible by the appended claim, may be resorted to without departing from the spirit and scope of the invention.

What I claim and desire to secure by Letters Patent, is:—

A hose coupling embodying a male and a female member, each having its inner face at one end cut away to provide an annular recess and an inwardly extending flange, the flange forming one wall of the recess, said female member furthermore provided at its opposite end with a pocket, the outer portion of the wall of the pocket being of the same diameter throughout and the inner portion gradually increasing in diameter towards the outer portion, said male member having one end thereof formed with an extension of less diameter than the body portion of said member and of a contour corresponding to that of the shape of the pocket, radially extending pins carried by said female member, a plurality of longitudinally extending resilient arms carried by said male member, each of said arms having an undercut portion intermediate its ends to provide a resilient connecting portion between relatively enlarged ends, the outer enlarged end of each of said arms provided with an opening adapted to receive the pins upon the female member, and a tapering metallic band positioned within each of said members for clamping a hose section in the annular recess.

In testimony whereof I affix my signature in the presence of two witnesses.

JOHN J. ANTIC.

Witnesses:
  H. C. EVERET,
  GEORGE F. ANTIC.